United States Patent
Tacx et al.

(10) Patent No.: US 12,157,781 B2
(45) Date of Patent: Dec. 3, 2024

(54) PROCESS FOR THE PREPARATION OF ETHYLENE HOMO- OR COPOLYMERS IN A TUBULAR REACTOR

(71) Applicant: SABIC GLOBAL TECHNOLOGIES B.V., Bergen Op Zoom (NL)

(72) Inventors: Jacobus Christinus Josephus Franciscus Tacx, Geleen (NL); Diego Mauricio Castaneda Zuniga, Geleen (NL); Peter Neuteboom, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 659 days.

(21) Appl. No.: 17/287,685

(22) PCT Filed: Oct. 29, 2019

(86) PCT No.: PCT/EP2019/079455
§ 371 (c)(1),
(2) Date: Apr. 22, 2021

(87) PCT Pub. No.: WO2020/094449
PCT Pub. Date: May 14, 2020

(65) Prior Publication Data
US 2021/0388129 A1 Dec. 16, 2021

(30) Foreign Application Priority Data
Nov. 8, 2018 (EP) ..................... 18205155

(51) Int. Cl.
*C08F 210/02* (2006.01)
(52) U.S. Cl.
CPC ........ *C08F 210/02* (2013.01); *C08F 2400/04* (2021.01)
(58) Field of Classification Search
CPC .... C08F 210/02; C08F 2400/04; C08F 10/02; C08F 2/02; C08F 110/02; C08F 2/34; C08F 2500/08; C08F 2500/09; C08F 2500/26
See application file for complete search history.

(56) References Cited

U.S. PATENT DOCUMENTS

| | | | |
|---|---|---|---|
| 6,610,797 B1 | 8/2003 | Deckers et al. | |
| 2012/0220738 A1* | 8/2012 | Mannebach | C08F 110/02 526/64 |
| 2018/0171046 A1 | 6/2018 | Berbee et al. | |
| 2018/0305476 A1 | 10/2018 | Berbee et al. | |

FOREIGN PATENT DOCUMENTS

| | | |
|---|---|---|
| EP | 2239283 A1 | 10/2010 |
| EP | 3168239 A1 | 5/2017 |
| EP | 3260472 A1 | 12/2017 |
| WO | 2005065818 A1 | 7/2005 |

OTHER PUBLICATIONS

European Search Report for European Application No. 18205155.7, Date of Filing Nov. 8, 2018, Date of Mailing May 17, 2019, 7 pages.
International Search Report for International Application No. PCT/EP2019/079455, International Filing Date Oct. 29, 2019, Date of Mailing Jan. 28, 2020, 6 pages.
Peacock Andrew J., "Handbook of Polyethylene, Chapter 3 Production Processes", 2000, Marcel Dekker, Inc., New York; ISBN 0824795466; p. 43-66.
Written Opinion for International Application No. PCT/EP2019/079455, International Filing Date Oct. 29, 2019, Date of Mailing Jan. 28, 2020, 7 pages.

* cited by examiner

*Primary Examiner* — Jessica M Roswell
(74) *Attorney, Agent, or Firm* — CANTOR COLBURN LLP

(57) ABSTRACT

The invention relates to a process for the preparation of low density polyethylene (LDPE) wherein the polymerisation takes place in a tubular reactor at peak temperatures ranging from 180° C. to 350° C. and at pressures ranging from 150 to 350 MPa and wherein the total effective length of the polymerisation reactor divided by the number of reaction zones is in the range from 230 to 350 m.

13 Claims, 1 Drawing Sheet

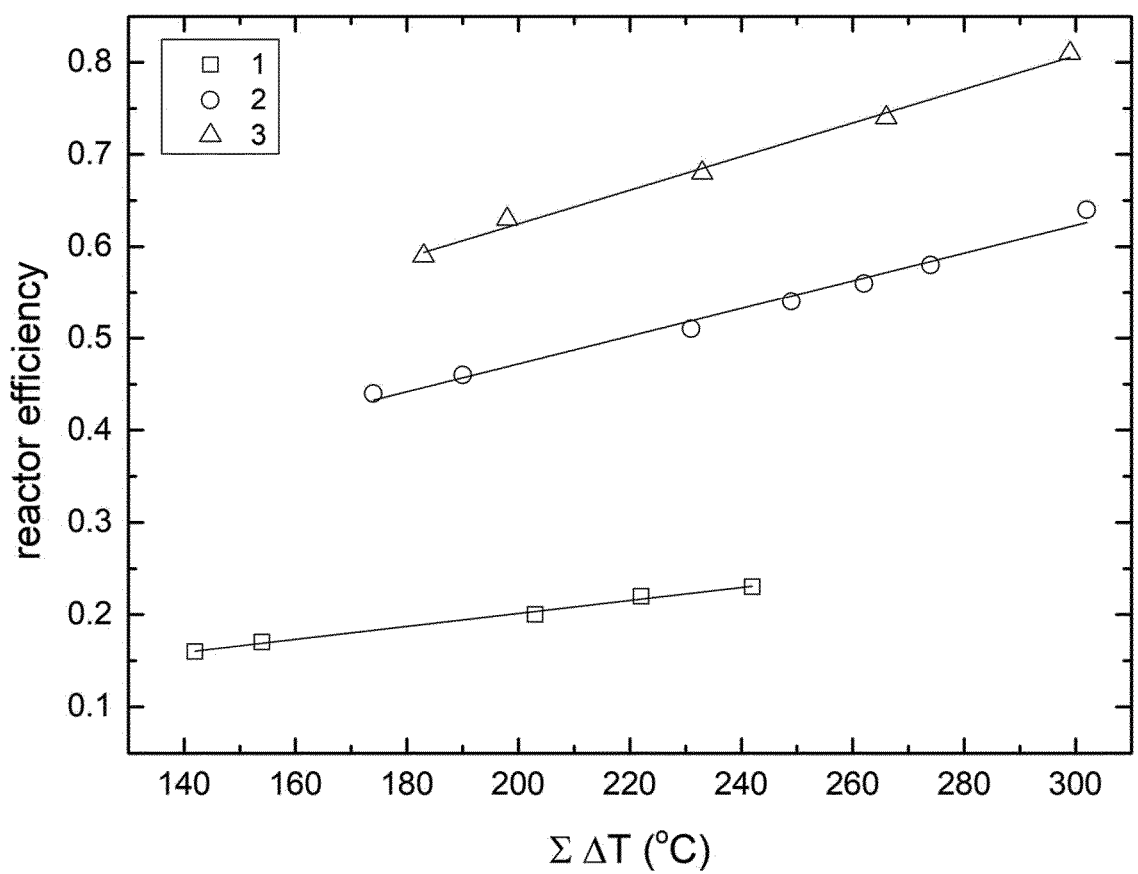

PROCESS FOR THE PREPARATION OF ETHYLENE HOMO- OR COPOLYMERS IN A TUBULAR REACTOR

CROSS REFERENCE TO RELATED APPLICATIONS

This application is a National Stage application of PCT/EP2019/079455, filed Oct. 29, 2019, which claims the benefit of European Application No. 18205155.7, filed Nov. 8, 2018, both of which are incorporated by reference in their entirety herein.

The present invention relates to a process for the preparation of homo- or copolymers of ethylene.

Low density polyethylene (LDPE) is applied for a variety of end applications. Typical fields of application are packaging, building and construction, agricultural, industrial and consumer goods.

For all applications it is required that the low density polyethylene shows an excellent processing behaviour. This can be achieved by the presence of long chain branching (LCB). It is for example known in the art that the foamability of LDPE is strongly related to LCB and in blown film, the balloon stability and draw down are related to LCB. In extrusion coating the neck in is related to LCB. In general, increasing the level of LCB results in an increase of melt strength. Therefore, there is a need to enhance the LCB in low density polyethylene to improve melt strength.

Low density polyethylene (LDPE) can be produced either by autoclave or tubular reactor technology. Tubular technology shows the advantage of higher conversion and less energy consumption/ton LDPE in comparison to autoclave technology. However, LDPE obtained by tubular technologies normally result in a relatively narrow molar mass distribution and lower levels of LCB compared to autoclave technology. This makes processing more difficult.

Next to the polymerisation process technology, the level of long chain branches is also dependent on the polymerisation conditions. It is known, that a low pressure leads to an increase in LCB. However, there are limits to the applicable ranges. The pressure is limited by the final pressure, which must be above the demixing pressure. With increasing average reactor temperature, it is known that the level of LCB also increases. This can be reached for example by increasing the peak temperatures. However, the maximum peak temperature is limited due to increasing risk of decomposition and runaway reactions. To increase the average reactor temperature the valley temperatures can also be increased. However, this leads to a decrease of conversion and to less LCB. Hence, the gain in average reactor temperature is annihilated by the loss of conversion. The conversion can be increased by dosing cold ethylene via side feed. However, this leads to a decrease of the average reactor temperature. In this case the gain in conversion is annihilated by the loss of average reactor temperature. Conversion and level of LCB could as well be increased by increasing the length of the reactor with or without additional peroxide injection points. However, this requires serious investments and is not desirable.

It is therefore an object of the present invention to provide a process for the preparation of LDPE that enhances the level of LCB and yields at the same time in a high conversion, while applying a short total effective reactor length.

This object has now been achieved according to the present invention by a process for the preparation of low density polyethylene (LDPE) wherein the polymerisation takes place in a tubular reactor at peak temperatures ranging from 180° C. to 350° C. and at a pressure ranging from 150 to 350 MPa and wherein the total effective length of the polymerisation reactor divided by the number of reaction zones is in the range from 230 to 350 m. Preferably, the total effective length of the polymerisation reactor divided by the number of reaction zones is in the range from 230 to 300 m.

The process according to the invention yields in a high total conversion and provides LDPE with high content of LCB. The invention enables to create polymers with sufficient LCB by minimizing the $\Delta T$ for high average reactor temperature and maximizing sum ($\Sigma$) of all $\Delta T$'s for high conversion ($\Sigma \Delta T$). Another advantage of the invention is that ethylene homo- or copolymers with higher densities can be obtained while simultaneously having a high conversion in the process. A further advantage of the process according to the invention is that the polymerisation reactor can be designed in such a way that the reactor length is below 2500 m which saves investments, and also reduces the carbon foot print per produced kg of polymer.

Definitions

LDPE, Ethylene Homo- or Copolymer

As used herein, low density polyethylene (LDPE) is defined herein as a polyethylene produced in a high pressure process. The term LDPE refers to both an ethylene homopolymer and an ethylene copolymer. The term LDPE and ethylene homo- or copolymer are used interchangeably.

The term ethylene homopolymer refers to polymers prepared from ethylene. The term ethylene copolymer as used herein refers to polymers of ethylene and one or more comonomers.

Peak Temperature

The peak temperature is defined as the maximum temperature reached after the reaction mixture has come in contact with the initiator or the initiator mixture.

Reaction Zone

Reaction zone is defined as the part of the reactor reaching from the position in the reactor, where the reaction mixture comes in contact with the initiator mixture to the position in the reactor of the next initiator mixture inlet. For the last peak along the reactor, the reaction zone is defined as the distance between the last injection point and the let down valve.

Total Effective Length of the Polymerisation Reactor

The total effective length of the polymerisation reactor is the sum of the length of all reaction zones.

Average Length of the Reaction Zones

The average length of the reaction zones is defined as the sum of the length of all reaction zones divided by the number of reaction zones.

$\Delta T$ $\Delta T$ is defined as the temperature difference of the peak temperature and the previous valley temperature. For the first peak, $\Delta T$ is defined as the temperature difference of the first peak temperature and the starting temperature.

Average $\Delta T$

Average $\Delta T$ is defined as sum of all $\Delta T$'s, divided by the number of reaction zones.

Valley Temperature

Valley temperature is defined as the minimum temperature reached in the cooling zone at the initiator injection point.

Conversion

Conversion needs to be understood as conversion of all applied monomers to polymer in wt %.

Reactor Efficiency

Reactor efficiency is defined as the conversion in wt % multiplied by the number of reaction zones and divided by the average length of the reaction zones.

Ethylene Feed Stream

The term ethylene feed stream as used herein, refers to a feed stream that is fed to the reactor and comprises a majority amount of ethylene, based on the molar amount of all of the components in the feed stream. The ethylene might be fresh ethylene or recycled ethylene. Optionally one or more chain transfer agents, comonomers, other process components such as lubrication oil, solvent etc. and/or impurities as for instance initiator degradation products might be present in the feed stream. Single ethylene feed stream means that ethylene is fed only at one location to the reactor.

The high-pressure polymerisation processes of ethylene are described in Handbook of Polyethylene by Andrew Peacock (2000; Dekker, ISBN 0824795466) at pages 43-53. A tubular reactor may for example be a reactor such as described in Nexant PERP Report 2013-2, 'Low Density Polyethylene', pages 31-48.

An advantage of polymerisation in such high-pressure free-radical process is that the polymerisation may be performed without the need for a catalyst being present. This leads to a very clean product. Further, this allows for the use of certain comonomers such as polar comonomers which are not suitable as comonomers in the production of ethylene copolymers via catalytic processes such as using Ziegler-Natta type catalysts because of the interference with such catalyst.

During the polyethylene high-pressure process in a tubular reactor polyethylene is prepared by radical polymerisation in supercritical ethylene. Metering an initiator such as for example organic peroxide, azodicarboxylic acid ester, azodicarboxylic acid dinitrile and hydrocarbons that decompose into radicals can start the polymerisation. The ethylene, which is compressed to the desired pressure, flows through the reactor tube which is provided on the outside with a jacket through which cooling water flows in order to remove the developed heat of reaction via the wall. The incoming ethylene is first heated to the decomposition temperature of the initiator, whereupon an initiator solution is metered and the polymerisation subsequently starts. Controlling the quantity of initiator attains the desired peak temperature. Thereafter the mixture cools and, after the temperature has dropped to a sufficiently low level, initiator is metered one or more times again via one of the initiator injection points. Downstream from the reactor the obtained product is transported to the product silos after for example extrusion, separation and drying. Owing to the exothermic nature of the reaction, the temperature increases as the reaction proceeds to a maximum peak temperature and considerable heat is evolved.

Generally the temperature in the reaction zone of the reactor ranges between 100° C. and 375° C. Generally the reactor inlet pressure ranges between 150 MPa and 350 MPa where reactor inlet pressure refers to the (total) pressure at which the feed stream leaves the compressor and enters the reactor.

The pressure in such high-pressure free-radical polymerisation process preferably is in the range of $\geq 150$ MPa and $\leq 350$ MPa. The temperature in such high-pressure free-radical polymerisation process preferably is in the range of $\geq 100$ and $\leq 350°$ C., preferably $\geq 150$ and $\leq 310°$ C.

The tubular polymerisation reactor and preheater, may have a tube length of for example $\geq 750$ m and $\leq 5000$ m. The tubular reactor including the preheater may for example have a ratio of length to inner diameter of $\geq 1000:1$, alternatively $\geq 10000:1$, alternatively $\geq 25000:1$, such as $\geq 10000:1$ and $\leq 50000:1$, alternatively $\geq 25000:1$ and $\leq 35000:1$.

The residence time in the tubular reactor including the preheater may for example be $\geq 30$ s and $\leq 300$ s, alternatively $\geq 60$ s and $\leq 200$ s.

Such tubular reactors may for example have an inner tubular diameter of $\geq 0.01$ m and $\leq 0.20$ m, alternatively $\geq 0.05$ m and $\leq 0.15$ m. The tubular reactor may for example have one or more inlet(s) and one or more outlet(s).

The feed composition may for example be fed to the tubular reactor at the inlet of the tubular reactor. The stream that exits the tubular reactor from the outlet may for example comprise the ethylene homo- or copolymer. The stream that exits the tubular reactor from the outlet may for example comprise unreacted feed composition. Such unreacted feed compositions may be recycled back into the tubular reactor via one or more inlet.

The reactor may be a tubular polymerisation reactor having the inside surface of the reactor profiled according to for example WO2005/065818. The profile can be provided both on a tube segment and on a coupling between the tube segments the profile forms a solid and integral body with the tube segment and/or with the coupling.

Preferably, ethylene is fed into the reactor by a single ethylene feed stream and the ethylene is fed to the first reaction zone.

Feeding of ethylene to the reactor by a single feed results in a less complex process technology in comparison to multiple ethylene feed streams.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 350 m and ethylene is fed into the reactor by a single ethylene feed stream and the ethylene is fed to the first reaction zone.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 300 m and ethylene is fed into the reactor by a single ethylene feed stream and the ethylene is fed to the first reaction zone.

In the process according to the invention it is preferred that the average $\Delta T$ is $\leq 55°$ C., and that the sum of all $\Delta T$'s is in the range from 100 to 350° C. More preferably, the sum of all $\Delta T$'s is in the range from 110 to 320° C.

The temperature difference between the first peak temperature and the last injection point of the initiator may be larger than 20° C.

In the process according to the invention it is preferred that the polymerisation takes place in a tubular reactor at peak temperatures ranging from 180° C. to 350° C. and at pressures ranging from 150 to 350 MPa and that the total effective length of the polymerisation reactor divided by the number of reaction zones is in the range from 230 to 350 m and that the average $\Delta T$ is $\leq 55°$ C. and that the sum of all $\Delta T$'s is in the range from 100 to 350° C., more preferably in the range from 110 to 320° C.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 300 m and the average ΔT is ≤55° C. and the sum of all ΔT's is in the range from 100 to 350° C., more preferably in the range from 110 to 320° C.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 350 m and the average ΔT is ≤55° C. and the sum of all ΔT's is in the range from 100 to 350° C., more preferably in the range from 110 to 320° C. and ethylene is fed into the reactor by a single ethylene feed stream and the ethylene is fed to the first reaction zone.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 300 m and the average ΔT is ≤55° C. and the sum of all ΔT's is in the range from 100 to 350° C., more preferably in the range from 110 to 320° C. and ethylene is fed into the reactor by a single ethylene feed stream and the ethylene is fed to the first reaction zone.

The present invention further relates to a process wherein the reactor efficiency is >0.36, preferably >0.40, more preferably >0.42, more preferably >0.44, and wherein the reactor efficiency is defined as the conversion in wt % multiplied by the number of reaction zones and divided by the average length of the reaction zones.

It is further preferred that the process for the preparation of low density polyethylene (LDPE) takes place in a tubular reactor at peak temperatures ranging from 180° C. to 350° C. and at pressures ranging from 150 to 350 MPa and that the total effective length of the polymerisation reactor divided by the number of reaction zones is in the range from 230 to 350 m and that the reactor efficiency is >0.36, preferably >0.40.

Preferably, the invention further provides a process wherein the average ΔT is ≤55° C. and wherein the sum of all ΔT's is in the range from 100 to 350° C. and wherein the reactor efficiency is >0.36, preferably >0.40, more preferably >0.42, more preferably >0.44.

Preferably, in the process for the preparation of low density polyethylene (LDPE), the polymerisation takes place in a tubular reactor at peak temperatures ranging from 180° C. to 350° C. and at pressures ranging from 150 to 350 MPa, the total effective length of the polymerisation reactor divided by the number of reaction zones is in the range from 230 to 350 m, the average ΔT is ≤55° C., the sum of all ΔT's is in the range from 100 to 350° C., and the reactor efficiency is >0.36, preferably >0.40, more preferably >0.42, more preferably >0.44.

Preferably, in the process for the preparation of low density polyethylene (LDPE), the polymerisation takes place in a tubular reactor at peak temperatures ranging from 180° C. to 350° C. and at pressures ranging from 150 to 350 MPa, the total effective length of the polymerisation reactor divided by the number of reaction zones is in the range from 230 to 300 m, the average ΔT is ≤55° C., the sum of all ΔT's is in the range from 100 to 350° C., and the reactor efficiency is >0.36, preferably >0.40, more preferably >0.42, more preferably >0.44.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 350 m and the average ΔT is ≤55° C. and the sum of all ΔT's is in the range from 100 to 350° C., more preferably in the range from 110 to 320° C. and ethylene is fed into the reactor by a single ethylene feed stream and the ethylene is fed to the first reaction zone and the reactor efficiency is >0.36.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 300 m and the average ΔT is ≤55° C. and the sum of all ΔT's is in the range from 100 to 350° C., more preferably in the range from 110 to 320° C. and ethylene is fed into the reactor by a single ethylene feed stream and the ethylene is fed to the first reaction zone and the reactor efficiency is >0.36.

Preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 350 m and the average ΔT is ≤55° C. and the sum of all ΔT's is in the range from 100 to 350° C., more preferably in the range from 110 to 320° C. and ethylene is fed into the reactor by a single ethylene feed stream and the ethylene is fed to the first reaction zone and the reactor efficiency is >0.40.

More preferably, the polymerisation takes place in a tubular reactor at peak temperatures ranging from 180° C. to 350° C. and at pressures ranging from 150 to 350 MPa and the total effective length of the polymerisation reactor divided by the number of reaction zones is in the range from 230 to 300 m and the average ΔT is ≤55° C. and the sum of all ΔT's is in the range from 100 to 350° C., more preferably in the range from 110 to 320° C. and and ethylene is fed into the reactor by a single ethylene feed stream and the ethylene is fed to the first reaction zone and the reactor efficiency is >0.40.

Preferably, in the process according to the invention one or more peroxides are used as initiator.

The person skilled in the art has to determine the suitable initiators or mixture of initiators, the concentration of the initiator and the injection point(s) being most suitable to be used. To obtain the desired peak temperature the person skilled in the art has to select the initiator (mixture) and the amount of initiator.

Suitable organic peroxides include for example peroxyester, peroxyketone, peroxyketal and peroxycarbonate such as for example di-2-ethylhexyl-peroxydicarbonate, diacetylperoxydicarbonate, dicyclohexyl-peroxydicarbonate, tert.-amylperpivalate, cumyl perneodecanoate, tert.-butylperneodecanoate, tert.-butyl perpivalate, tert.-butylpermaleinate, tert.-butylperisononanoate, tert.-butylperbenzoate, tert,-butylperoxy-2-ethylhexanoate. tert.-butyl-hydroperoxide, d-tert. butyl peroxide, di-isopropylbenzol hydroperoxide, di-isononanoyl peroxide, didecanoylperoxide, cumol hydroperoxide, methyl isobutyl ketone hydroperoxide, 2,2-bis-(tert.-butylperoxy)-butane and/or 3,4-dimethyl-3,4-diphenylhexane.

Also difunctional or higher functional peroxides may be applied.

According to a preferred embodiment of the invention the peroxide is a difunctional peroxide.

Suitable bifunctional peroxides include for example 2,5-dimethyl-2,5-di-tert-butylperoxyhexane, 2,5-dimethyl-2,5-tert-peroxyhexyne-3 3,6,9-triethyl-3,6,9-trimethyl-1,4,7-triperoxononane, 3,3,6,6,9,9-hexamethyl-1,2,4,5- tetraoxacyclononane, n-ethyl-4,4-di-tert-butylperoxyvalerate, 1,1-di-tert-butylperoxy-3,3,5-trimethylcyclohexane, ethyl-3,3-di-tert-butylperoxybutyrate 1,1-di-tert-butylperoxycyclohexane, 2,2-di-tert-butylperoxybutane ethyl-3,3-di-tert-amylperoxybutyrate, 2,2-di-4,4-di-tert-butylperoxycyclohexylpropane, methyl-isobutyl-peroxide, 1,1-di-tert-amylperoxycyclohexane, 1,1-di-tert-butylperoxycyclohexane, 2,5-di-methyl-2,5-di-2-ethyl-hexanoylperoxyhexane and/or 1,4-di-tert-butylperoxycarbocyclohexane may be applied.

The initiator concentration generally ranges between 0.5 ppm (weight) and 100 ppm (weight) relative to the quantity of ethylene.

During the polymerisation it is also possible to add for example inhibitors, scavengers and/or a chain regulator (such as for example an alcohol, an aldehyde, a ketone or an aliphatic hydrocarbon). Very suitable chain regulators are for instance isopropyl alcohol, propane, propylene and propionaldehyde.

It is preferred that the polymerisation takes place in a tubular reactor at peak temperatures ranging from 180° C. to 350° C. and at a pressure ranging from 150 to 350 MPa and that the total effective length of the polymerisation reactor divided by the number of reaction zones is in the range from 230 to 350 m and that one or more peroxides are used as initiator.

It is further preferred that in the process according to the invention, the average $\Delta T$ is $\leq 55°$ C., the sum of all $\Delta T$'s is in the range from 100 to 350° C. and one or more peroxides are used as initiator.

The invention further provides a process, wherein a reactor efficiency is >0.36, preferably >0.40, more preferably >0.42, more preferably >0.44 and wherein one or more peroxides are used as initiator.

Preferably, the polymerisation takes place in a tubular reactor at peak temperatures ranging from 240° C. to 350° C. and at pressures ranging from 150 to 350 MPa, wherein the total effective length of the polymerisation reactor divided by the number of reaction zones is in the range from 230 to 350 m, the average $\Delta T$ is $\leq 55°$ C., the sum of all $\Delta T$'s is in the range from 100 to 350° C. and one or more peroxides are used as initiator.

Preferably, the polymerisation takes place in a tubular reactor at peak temperatures ranging from 180° C. to 350° C. and at pressures ranging from 150 to 350 MPa, wherein the total effective length of the polymerisation reactor divided by the number of reaction zones is in the range from 230 to 350 m, the reactor efficiency is >0.36, preferably >0.40, more preferably >0.42, more preferably >0.44, and one or more peroxides are used as initiator.

According to a preferred embodiment, the process for the preparation of low density polyethylene (LDPE) takes place in a tubular reactor at peak temperatures ranging from 180° C. to 350° C. and at pressures ranging from 150 to 350 MPa, the total effective length of the polymerisation reactor divided by the number of reaction zones is in the range from 230 to 350 m, the average $\Delta T$ is $\leq 55°$ C., the sum of all $\Delta T$'s is in the range from 100 to 350° C., the reactor efficiency is >0.36, preferably >0.40, more preferably >0.42, more preferably >0.44 and one or more peroxides are used as initiator.

Preferably the long chain branching (LCB) content of the LDPE is ≥1.5/1000 C, more preferably ≥1.7/1000 C.

Long chain branching refers to branches of more than 6 carbon units (6+).

The invention further provides a process for the preparation of low density polyethylene (LDPE) wherein the polymerisation takes place in a tubular reactor at peak temperatures ranging from 180° C. to 350° C. and at pressures ranging from 150 to 350 MPa and wherein the total effective length of the polymerisation reactor divided by the number of reaction zones is in the range from 230 to 350 m and wherein the long chain branching (LCB) content of the LDPE is ≥1.5/1000 C, preferably ≥1.7/1000 C.

The invention further includes a process, wherein the average $\Delta T$ is $\leq 55°$ C., wherein the sum of all $\Delta T$'s is in the range from 100 to 350° C., more preferably in the range from 110 to 320° C. and wherein the long chain branching (LCB) content of the LDPE is ≥1.5/1000 C, preferably ≥1.7/1000 C.

The invention further includes a process wherein a reactor efficiency is >0.36, preferably >0.40, more preferably >0.42, more preferably >0.44, and wherein the long chain branching (LCB) content of the LDPE is ≥1.5/1000 C, preferably ≥1.7/1000 C.

Preferably, one or more peroxides are used as initiator for the polymerisation process and the long chain branching (LCB) content of the LDPE is ≥1.5/1000 C, preferably ≥1.7/1000 C.

In the process according to the invention, it is preferred that the polymerisation takes place in a tubular reactor at peak temperatures ranging from 180° C. to 350° C. and at a pressure ranging from 150 to 350 MPa, the total effective length of the polymerisation reactor divided by the number of reaction zones is in the range from 230 to 350 m, the average $\Delta T$ is $\leq 55°$ C., the sum of all $\Delta T$'s is in the range from 100 to 350° C., more preferably in the range from 110 to 320° C., and the long chain branching (LCB) content of the LDPE is ≥1.5/1000 C, preferably ≥1.7/1000 C.

In the process according to the invention, it is further preferred that the polymerisation takes place in a tubular reactor at peak temperatures ranging from 180° C. to 350° C. and at pressures ranging from 150 to 350 MPa, the total effective length of the polymerisation reactor divided by the number of reaction zones is in the range from 230 to 350 m, the average $\Delta T$ is $\leq 55°$ C., the sum of all $\Delta T$'s is in the range from 100 to 350° C., the reactor efficiency is >0.36, preferably >0.40, more preferably >0.42, more preferably >0.44, one or more peroxides are used as initiator and the long chain branching (LCB) content of the LDPE is ≥1.5/1000 C, preferably ≥1.7/1000 C.

In the process according to the invention, it is further preferred that the polymerisation takes place in a tubular reactor at peak temperatures ranging from 180° C. to 350° C. and at a pressure ranging from 150 to 350 MPa, the total effective length of the polymerisation reactor divided by the number of reaction zones is in the range from 230 to 350 m, the average $\Delta T$ is $\leq 55°$ C., the sum of all $\Delta T$'s is in the range from 100 to 350° C., the reactor efficiency is >0.36, preferably >0.40, more preferably >0.42, more preferably >0.44, the long chain branching (LCB) content of the LDPE is ≥1.5/1000 C.

Preferably, the reactor inlet pressure is between 150 MPa and 350 MPa.

The comonomer may be added at one injection point or at different injection points downstream in the axial direction of the reactor tube or in the ethylene feedstream between primary and hyper compressor or ethylene feed stream behind the hyper compressor.

According to a preferred embodiment of the invention the comonomer is added at different injection points downstream the axial direction of the reactor tube.

In the process according to the invention, it is preferred that the comonomer is selected from the group consisting of acrylates, methacrylates, alkenes, alkynes, alkoxy's, vinylethers, dienes, carbon monoxide and combinations thereof. Preferably, the amount of the units derived from the comonomer in the copolymer ranges from ≥0.05 to ≤20.0 mol %.

In the process according to the invention, it is further preferred that the comonomer is selected from the group consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate, 2-hydroxyethyl vinyl ether, vinylacetate and combinations thereof. Preferably, the amount of the units derived from the comonomer in the copolymer ranges from ≥0.10 to ≤20.0 mol %.

In the process according to the invention, it is preferred that the comonomer is selected from the group consisting of 4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly(ethylenepropyleneglycol) dimethacrylate, trimethylol propane trimethacrylate, trimethylol propane triacrylate, 1,4-butanediol divinyl ether, poly(ethylene glycol) divinyl ether, di(ethyleneglycol) divinyl ether, 1,5-hexadiene, 1,7-octadiene, 1,9-decadiene, 1,13-tetradecadiene and combinations thereof and/or preferably, the amount of the units derived from the di- or multifunctional comonomer in the copolymer ranges from ≥0.01 to ≤2.00 mol %.

A further object of the invention is to provide an ethylene homo- or copolymer obtained by or obtainable by the process according to the invention.

Generally, the density of the obtained ethylene homo- or copolymer ranges between 910 kg/m$^3$ and 980 kg/m$^3$ (according to ISO 1183).

The ethylene homo- or copolymer according to the present invention may for example have a melt mass-flow rate as determined in accordance with ISO 1133-1 (2011), at a temperature of 190° C. and a load of 2.16 kg of ≥0.1 and ≤150.0 g/10 min, more preferably of ≥1.0 and ≤100.0 g/10 min, even more preferably of ≥5.0 and ≤50.0 g/10 min. For ethylene homo- or copolymers of the invention the Mn is related to MFl.

The ethylene homo- or copolymer according to the present invention may for example have a Mn ranging from 5 to 30 kg/mole as determined by SEC-MALS as described in Macromol. Theory Simul. 2017, 1700058 page 1-12.

The ethylene homo- or copolymer obtained with the process according to the invention is suitable to be used in extrusion coating applications. The process results into an increase of conversion and an increase of LCB. An increase of LCB leads to an increase of melt strength which in turn is advantageous for processing.

A further object of the invention is therefore to provide an extrusion coating composition comprising the ethylene homo- or copolymer obtained by or obtainable by the process according to the invention.

An extrusion coating composition is defined as a composition that is suitable to be used in an extrusion coating process. The extrusion coating process is defined as a process wherein a substrate is coated with the extrusion coating composition leading to an article such as an extrusion coated laminate or sheet. The substrate is typically a fibrous substrate, such as paper, paperboard or Kraft paper or woven or non-woven fabrics; a metal foil, such as aluminum foil; or a plastic film, such as a biaxially oriented polypropylene film, PET film, PA film or cellophane film. Further substrates may also include less flexible substrates, such as metallic or wooden substrates.

The coatings provide for example a very good adhesion and heat sealing performance and moisture barrier to the substrate. Suitable fields of application are for example liquid packaging cartons, aseptic packaging, food packaging, tapes, paper board cups, food carton stock, frozen food and dual oven able trays, pouches, multi wall bags, release papers and photographic papers such as for example ink jet papers.

The extrusion coating process may be carried out using conventional extrusion coating techniques. Hence, the ethylene homo- or copolymer of the invention, or the composition of the invention, is fed to an extruding device. From the extruder the melt of the ethylene homo- or copolymer of the invention, or of the composition of the invention, is passed through a flat die to the substrate to be coated. Due to the distance between the die lip and the nip, the molten plastic is oxidized in the air for a short period, usually leading to an improved adhesion between the coating and the substrate. The coated substrate is cooled on a chill roll. Coating layer can be post corona treated to make it suitable for e.g. printing or glueing.

Description of extrusion coating process is given, for instance, in Extrusion Coating: A Process Manual by B. H. Gregory (Trafford Publishing, 2005) and in Extrusion: The Definitive Processing Guide and Handbook by Harold F. Giles Jr, Eldridge M. Mount III, John R. Wagner, Jr. (William Andrew Inc., 2004)

The extrusion coated article may comprise at least one layer of the ethylene homo- or copolymer of the invention, or at least one layer of the composition of the invention.

Further, the article may comprises a substrate and at least one extrusion coated layer based on the ethylene homo- or copolymer of the invention, or the composition of the invention. As mentioned above the substrate is extrusion coated and thus at least one surface of the substrate is coated. However, both sides of the substrate, i.e. the outer and inner surface (side) of the substrate may be extrusion coated. The extrusion coated layer based on the ethylene homo- or copolymer of the invention, or based on the composition of the invention, may be in directed contact with the substrate or that between the substrate and the layer based on the ethylene homo- or copolymer of the invention, or based on the composition of the invention, at least one further layer is inserted, like an adhesive layer. The layer based on the ethylene homo- or copolymer of the invention, or based on the composition of the invention, comprised in the extrusion coated substrate may have a thickness in the range of 5 to 1000 μm, more preferably in the range of 10 to 100 μm.

A further object of the invention is to provide an article comprising the ethylene homo- or copolymer obtained by or obtainable by the process according to the invention.

Likewise, it is object of the invention to provide a foam, film, blown film, cast film, extrusion coated laminate or sheet comprising the ethylene homo- or copolymer obtained by or obtainable by the process the invention.

The polymer obtained with the process according to the invention can also be applied in for example the film segment, in blown films, in the cast film segment, in packaging applications, in moulding applications for example closures and medical and consumer bottles, in wire and cable coating applications for electrical and communication cables, in foams, in master batches.

Further, the invention provides a process for making an article comprising the ethylene homo- or copolymer composition obtained by or obtainable by the process according to the invention or comprising the ethylene homo- or copolymer composition according to the invention.

A further object of the invention includes the use of the ethylene homo- or copolymer obtained by or obtainable by the process according to the invention for making an article.

The invention is elucidated on the basis of the following non-limiting examples.

EXAMPLES

Calculations of ethylene homopolymerisation have been performed based on deterministic and stochastic modelling as outlined by Kiparissides (A COMPREHENSIVE MATHEMATICAL MODEL FOR A MULTIZONE TUBULAR HIGH PRESSURE LDPE REACTOR, C. KIPARISSIDES, G. VERROS, G. KALFAS, M. KOUTOUDI & C. KANTZIA, Chem. Eng. Comm 1993, Vol 121, Pages 193-217, Publishers Gordon and Breach Science Publishers S.A.) and by M. Busch (Busch, M., Macromolecular Theory and Simulations, 2001, 10, 408-429).

Calculations were made for 4, 6 and 7 initiator injection points, total effective reactor length is 1940-2100 meter and an internal diameter of 59 mm. The calculations were carried out using the following conditions:

Feed of ethylene: 70636 kg/h
Starting temperature T: 159° C.
Pressure at inlet: 259 MPa Comparative Example 1

TABLE 1

Overview of calculation parameters and obtained molecular characteristics for a reactor with 4 reaction zones.

| | | | | | | |
|---|---|---|---|---|---|---|
| number of reaction zones | — | 4 | 4 | 4 | 4 | 4 |
| average length/reaction zone | m | 445 | 445 | 445 | 445 | 445 |
| peak temperature | ° C. | 300 | 290 | 280 | 260 | 255 |
| average temperature | ° C. | 273 | 266 | 259 | 244 | 240 |
| Average $\Delta T$ | ° C. | 61 | 56 | 51 | 39 | 36 |
| Sum of $\Delta T$ ($\Sigma\Delta T$) | ° C. | 242 | 222 | 203 | 154 | 142 |
| Conversion | % | 26 | 24 | 22 | 19 | 18 |
| reactor efficiency | | 0.23 | 0.22 | 0.20 | 0.17 | 0.16 |
| LCB content | /1000 C | 3.0 | 2.4 | 2.0 | 1.4 | 1.2 |
| Mn | dalton | 11287 | 11252 | 11271 | 11285 | 11293 |

Inventive Example 1

TABLE 2

Overview of calculation parameters and obtained molecular characteristics for a reactor with 6 reaction zones.

| | | | | | | |
|---|---|---|---|---|---|---|
| number of reaction zones | — | 6 | 6 | 6 | 6 | 6 | 6 |
| average length/reaction zone | m | 297 | 297 | 297 | 297 | 297 | 297 |
| peak temperature | ° C. | 300 | 290 | 285 | 280 | 273 | 260 |
| average temperature | ° C. | 282 | 274 | 269 | 265 | 259 | 248 |
| Average $\Delta T$ | ° C. | 50 | 46 | 44 | 42 | 39 | 32 |
| Sum of $\Delta T$ ($\Sigma\Delta T$) | ° C. | 302 | 274 | 262 | 249 | 231 | 190 |
| Conversion | % | 32 | 29 | 28 | 27 | 25 | 23 |
| reactor efficiency | | 0.65 | 0.58 | 0.56 | 0.54 | 0.51 | 0.46 |
| CTA feed | vol % | 1.5 | 1.8 | 2.0 | 2.1 | 2.3 | 2.6 |
| LCB content | /1000 C | 3.8 | 3.09 | 2.79 | 2.53 | 2.21 | 1.75 |
| Mn | dalton | 11286 | 11251 | 11272 | 11254 | 11259 | 11264 |

Inventive Example 2

TABLE 3

Overview of calculation parameters and obtained molecular characteristics for a reactor with 7 reaction zones.

| | | | | | | |
|---|---|---|---|---|---|---|
| number of reaction zones | — | 7 | 7 | 7 | 7 | 7 |
| average length/reaction zone | m | 277 | 277 | 277 | 277 | 277 |
| peak temperature | ° C. | 290 | 280 | 270 | 260 | 255 |
| average temperature | ° C. | 272 | 266 | 257 | 252 | 244 |

TABLE 3-continued

Overview of calculation parameters and obtained molecular characteristics for a reactor with 7 reaction zones.

| number of reaction zones | — | 7 | 7 | 7 | 7 | 7 |
|---|---|---|---|---|---|---|
| Average ΔT | ° C. | 43 | 38 | 33 | 28 | 26 |
| Sum of ΔT (ΣΔT) | ° C. | 201 | 177 | 150 | 122 | 110 |
| Conversion | % | 32 | 29 | 27 | 25 | 23 |
| reactor efficiency | | 0.81 | 0.74 | 0.68 | 0.63 | 0.59 |
| CTA feed | vol % | 1.8 | 2.0 | 2.3 | 2.5 | 2.7 |
| LCB content | /1000 C | 3.5 | 2.83 | 2.32 | 1.91 | 1.7 |
| Mn | dalton | 11290 | 11277 | 11322 | 11312 | 11282 |

The conditions used for comparative example 1 result in a material which is called the base case. The molecular characteristics were calculated for four peroxide dosing points. Subsequently, additional peroxide dosing points were added within the same reactor length. From these results, it is evident that with increasing number of additional dosing points the conversion increases and the average temperature, too. Moreover, the number of LCB/1000 C (long chain branches/1000 carbons) significantly increases. This improves melt strength and processability of the material. Further the reactor efficiency can be increased as shown in FIG. 1. In FIG. 1, 1 (□) refers to the comparative example, 2 (○) refers to inventive example 1 and 3 (Δ) refers to inventive example 2.

The invention claimed is:

1. A process for the preparation of low density polyethylene (LDPE) wherein the polymerisation takes place in a tubular reactor at peak temperatures ranging from 180° C. to 350° C. and at pressures ranging from 150 to 350 MPa and wherein the total effective length of the polymerisation reactor divided by the number of reaction zones is in the range from 230 to 300 m, wherein the average ΔT is ≤55° C. and wherein the sum of all ΔT's (ΣΔT) is in the range from 100 to 350° C., wherein ethylene is fed into the reactor by a single ethylene feed stream and wherein the ethylene is fed to the first reaction zone.

2. A process according to claim 1 wherein a reactor efficiency is >0.36, wherein the reactor efficiency is defined as the conversion in wt % multiplied by the number of reaction zones and divided by the average length of the reaction zones.

3. A process according to claim 1, wherein one or more peroxides are used as initiator.

4. A process according to claim 1, wherein the LDPE has a long chain branching (LCB) content of ≥1.5/1000 C.

5. A process according to claim 1, wherein the comonomer is selected from the group consisting of acrylates, methacrylates, alkenes, dienes, carbon monoxide and combinations thereof.

6. A process according to claim 1, wherein the LDPE is a copolymer of ethylene and a comonomer, and the comonomer is selected from the group consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate, 2-hydroxyethyl vinyl ether, vinylacetate and combinations thereof.

7. A process according to claim 1, wherein the LDPE is a copolymer of ethylene and a comonomer, and the comonomer is selected from the group consisting of 4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly(ethylenepropyleneglycol) dimethacrylate, trimethylol propane trimethacrylate, trimethylol propane triacrylate, 1,4-butanediol divinyl ether, poly(ethylene glycol) divinyl ether, di(ethyleneglycol) divinyl ether, 1,5-hexadiene, 1,7-octadiene, 1,9-decadiene, 1,13-tetradecadiene and combinations thereof.

8. A process according to claim 1, wherein the reactor inlet pressure is between 150 MPa and 350 MPa.

9. A process according to claim 1 wherein the sum of all ΔT's (ΣΔT) is in the range from 110 to 320° C.

10. A process according to claim 1 wherein a reactor efficiency is >0.4, and the reactor efficiency is defined as the conversion in wt % multiplied by the number of reaction zones and divided by the average length of the reaction zones.

11. A process according to claim 6, wherein an amount of units derived from the comonomer in the copolymer ranges from ≥0.10 to ≤20.0 mol %.

12. A process according to claim 1, wherein the LDPE has a long chain branching (LCB) content of ≥1.7/1000 C.

13. A process for the preparation of low density polyethylene (LDPE) wherein the polymerisation takes place in a tubular reactor at peak temperatures ranging from 180° C. to 350° C. and at pressures ranging from 150 to 350 MPa,
wherein the total effective length of the polymerisation reactor divided by the number of reaction zones is in the range from 230 to 300 m,
the average ΔT is ≤55° C., the sum of all ΔT's (ΣΔT) is in the range from 100 to 350° C., and
ethylene is fed into the reactor by a single ethylene feed stream and wherein the ethylene is fed to the first reaction zone, and
wherein a reactor efficiency is >0.36, wherein the reactor efficiency is defined as the conversion in wt % multiplied by the number of reaction zones and divided by the average length of the reaction zones, and
the LDPE has a long chain branching (LCB) content of ≥1.5/1000 C.

* * * * *